United States Patent [19]

Ebashi

[11] Patent Number: 5,709,012
[45] Date of Patent: Jan. 20, 1998

[54] BELT CLIP INTEGRATED WITH STRUCTURE TO RECEIVE CHAIN CLIP

[75] Inventor: Shinichi Ebashi, Tokyo, Japan

[73] Assignee: Uniden Corporation, Tokyo, Japan

[21] Appl. No.: 550,499

[22] Filed: Oct. 30, 1995

[51] Int. Cl.$^6$ ..................................... A44B 21/00
[52] U.S. Cl. .................. 24/3.11; 24/3.12; 24/3.13; 24/298; 224/667; 224/669; 224/670
[58] Field of Search ...................... 24/3.11, 3.12, 24/3.13, 3.5, 298, 299; 224/666, 667, 668, 669, 670, 254, 220, 269; 455/351, 348

[56] References Cited

U.S. PATENT DOCUMENTS

| | | | |
|---|---|---|---|
| 1,490,871 | 4/1924 | Wagner | 24/3.13 |
| 4,641,370 | 2/1987 | Oyamada | 455/351 X |
| 4,779,778 | 10/1988 | Nixon | 224/269 |
| 5,038,985 | 8/1991 | Chapin . | |
| 5,044,049 | 9/1991 | Owens et al. | 24/3.13 |
| 5,185,906 | 2/1993 | Brooks . | |
| 5,329,670 | 7/1994 | Huang . | |
| 5,499,429 | 3/1996 | Higginbotham | 24/3.11 X |

FOREIGN PATENT DOCUMENTS

| | | | |
|---|---|---|---|
| 58-21398 | 2/1983 | Japan . | |
| 3-171831 | 7/1991 | Japan . | |
| 403268615 | 11/1991 | Japan | 455/351 |
| 4-110035 | 9/1992 | Japan . | |
| 5-191057 | 7/1993 | Japan . | |
| 2644 | 11/1892 | United Kingdom | 24/298 |

Primary Examiner—Peter M. Cuomo
Assistant Examiner—Hanh V. Tran
Attorney, Agent, or Firm—Lowe, Price, LeBlanc & Becker

[57] ABSTRACT

A receiving section for receiving a chain clap is provided not in a portable terminal unit itself, but in a belt clip to be clamped to a portable terminal unit, and the receiving section is integrated with the belt clip with molded resin.

8 Claims, 4 Drawing Sheets

FIG. 1A
FIG. 1B
FIG. 1C
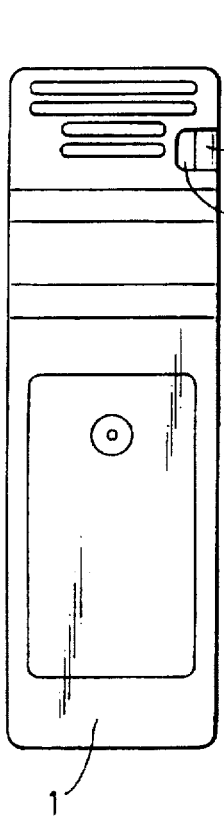
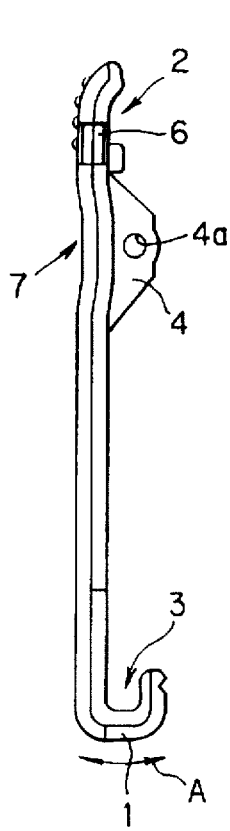
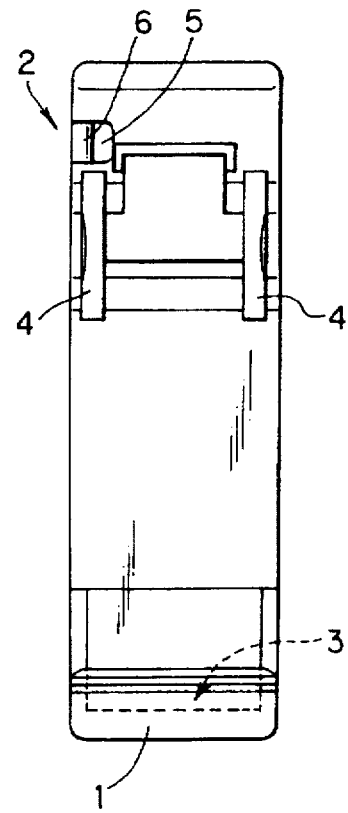
FIG. 2
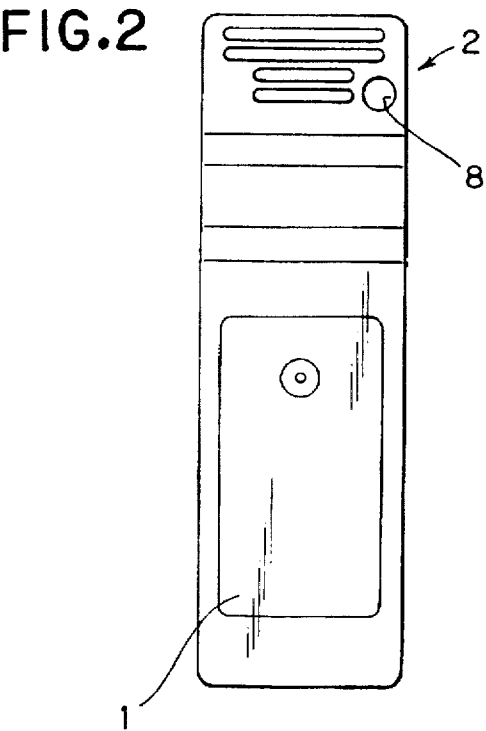

5,709,012

BELT CLIP INTEGRATED WITH STRUCTURE TO RECEIVE CHAIN CLIP

This patent application is the subject of a submission under the Disclosure Document Program, which was filed thereunder by applicants on Oct. 14, 1994 and identified as Disclosure Document No. 364057 with its accompanying fee paid under the provisions of all the Rules and Regulations including 37 CFR $1.21(c).

FIELD OF THE INVENTION

The present invention relates to a belt clip integrated with a structure to receive a chain clip, and more particularly to construction of a belt clip clamped onto a portable terminal unit such as a pager for clipping the portable terminal unit onto a belt in which a receiving section for receiving a chain clip is integrated with the belt clip with molded resin.

BACKGROUND OF THE INVENTION

As a conventional type of construction for fitting a chain clip to a portable terminal unit such as a pager, there is, for instance, the "strap holder construction for a portable terminal unit" disclosed in Japanese Patent Laid-Open Publication No.191057/1993, is a portable terminal unit with a printed board 22 accommodated in a casing, in which projecting sections 19, 20 facing to each other with a through hole 18 provided in one of the projecting sections and a screw hole provided in the other one are provided in a pair of upper and lower cases 16, 17, as shown in FIG. 5A and FIG. 5B, so that the upper and lower cases 16, 17 are fixed together by inserting a screw 21 into the through hole 18, and the portable terminal unit has an opening section 29 to outside provided near a projecting section 19 in the lower case 17 and a holder 27 comprising an engaging section 24 having an engaging hole 23 detachably engaged with an external side of the projecting section 19 and a projecting section 26 integrated with the engaging section 24 and a fastening hole 25 for fastening thereto a strap 28 passed through the opening section 29 and positioned outside the case.

The "Structure for receiving a fitting for fitting a chain clip for a receiver for individual calling" disclosed in Japanese utility Model Laid-open No. 110035/1992.

In this document is disclosed a structure as shown in FIG. 6A and FIG. 6B, in which, a fitting receiving section 31 is provided at a corner of a receiver for individual calling a fitting 35 having a hole 34 for fitting a chain clip 33 is fitted to a rotary pin 32 hooked in the fitting receiving section 31, and the fitting 35 is received in the fitting receiving section 31 by rotating the fitting 35.

Furthermore, described in Japanese Patent Laid-Open No. 171831/1991 disclosing the "chain clip accommodating device" is a concrete structure for connecting a chain clip via a fitting to a main body of a receiver like in the conventional technology.

However, in the conventional technologies as described above, connection of a chain or a chain clip is made by using a metal fitting, a holder, or a catch, so that a number of required parts increases with the product cost increased and assembling process complicated.

Furthermore in some cases the metal fitting, holder, or catch projects from a main body of a device, which results in formation of a projection not required for a design of the device. Especially in a case where a chain clip is not used, the projection formed by the metal fitting, holder, or catch from a main body of a device as described above is troublesome in actual use of the device (However, in a case of the technology disclosed in Japanese. Utility Model Laid-Open No. 110035/1992, a metal fitting is accommodated in a receiving section when the chain clip is not used, so that the problem as described above does not occur).

SUMMARY OF THE INVENTION

It is a first object of the present invention to obtain a belt clip clamped to a portable terminal unit such as a pager for clipping the portable terminal unit to the belt, in which a receiving section for receiving a chain clip is integrated with the belt clip with molded resin for the purpose to reduce a number of required parts, reducing the product cost, and eliminating a complicated process for assembling the device.

Also it is a second object to obtain, without changing a form of a main body of a device for receiving a chain clip, a belt clip in which an unnecessary projection is eliminated also from the belt clip to simplify the design and also to eliminate troubles in actual use of the device.

To achieve the objects as described above, the present invention provides a belt clip clamped to a portable terminal unit for clipping the portable terminal unit to a belt, in which a receiving section for receiving a chain clip integrated with the belt clip with molded resin is formed in a portion the belt clip.

With this invention, a receiving section for receiving a chain clip is provided not in a portable terminal unit itself, but in a belt clip to be clamped to a portable terminal unit, and the receiving section is integrated with the belt clip with molded resin.

Also in the present invention, a receiving section provided in an upper section of a belt clip along one edge thereof in its longitudinal direction for an edge section of a chain clip to be engaged therewith, a hook-shaped hooking section for clamping, for instance, to a belt for trousers provided on one edge section of the belt clip in its shorter direction, and a second set of ears provided in an upper section of a rear surface of the belt clip in the vertical direction against the basic body of the belt clip and having a pinhole for clamping the belt clip to a first set of ears of a basic body of a portable terminal unit, are integrated with each other by means of resin molding, and the receiving section is provided by forming a notched section in an upper section of the belt clip along one edge thereof in its longitudinal section in an inner side from the edge, and an engaging pin for engaging the chain clip therewith are monolithically formed by molding.

Other objects and features of this invention will become understood from the following description with reference to the accompanying drawings.

BRIEF DESCRIPTION OF THE DRAWINGS

FIGS. 1A, 1B and 1C are explanatory views showing construction of a belt clip according to the present invention;

FIG. 2 is an explanatory view showing another construction of the belt clip according to the present invention;

FIGS 6A and 68 are explanatory views showing a conventional type of structure for fitting a strap to a portable terminal unit such as a pager.

DESCRIPTION OF THE PREFERRED EMBODIMENTS

Figure 3:
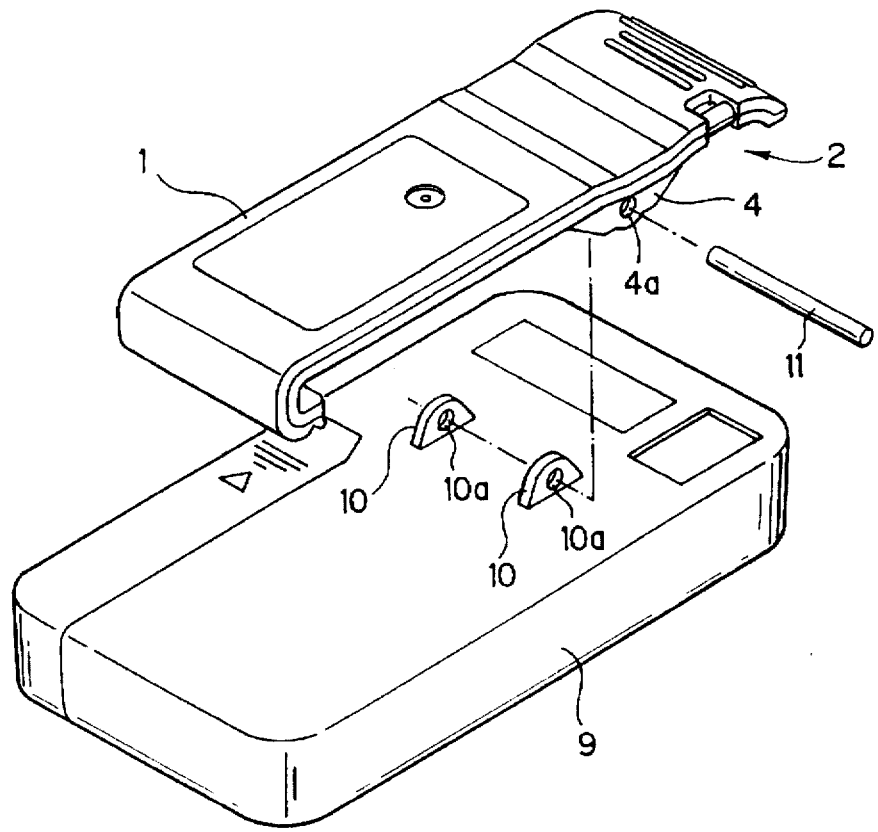
FIG. 3 is an explanatory view showing a method of clamping a belt clip to a pager according to the present invention.

Detailed description is made for embodiments of a belt clip integrated with a structure for receiving a chain clip according to the present invention.

FIG. 1 is a belt clip according to the present invention. FIG. 1A is a front view showing the belt clip, FIG. 1B is a side view, and FIG. 1C is a rear view each showing the same, and in the belt clip 1 shown in these views, a receiving section provided along one edge of the belt clip 1 in an upper section thereof in its longitudinal direction for a ring-shaped clip provided at one edge of a chain clip to be engaged therein, a hook-shaped hooking section provided on one edge of thereof in its shorter direction for clamping, for instance, to a belt for trousers, and a second set of ears provided at two positions above the hooking section 3 at the rear side thereof in the vertical direction against a basic body of the belt clip 1 and having a pin hole 4a or clamping the belt clip 1 to a basic body of a pager are integrated with each other by means of molding.

Furthermore, a bending section 7 is formed in an upper section of the belt clip 1 so that the belt clip 1 can be bent in the direction indicated by arrow A shown in FIG. 1B.

In the receiving section 2, a notched section 5 is provided in an upper section along one edge of the belt clip in an upper section in its longitudinal direction in an inner side from the edge, and inside the notched section 5, an engaging pin 6 for engaging therein a ring-shaped clap provided at an edge of a chain clip is monolithically formed by molding.

As a variant of the embodiment shown in FIG. 1, as shown in FIG. 2, the receiving section 2 may be monolithically formed by molding so that an engaging hole 8 is simply formed in an upper section of the belt clip 1 along one edge thereof in its longitudinal direction in an inner side from the edge. Construction of other portions of the embodiment shown in FIG. 2 is the same as that shown in FIG. 1.

Next, a description is made for a case where the belt clip 1 according to the present invention is clamped to a pager 9 by using the set of ears described above with reference to FIG. 3. A first set of ears 10 having a pin hole 10a like the second set of ears of the belt clip 1 is provided at a position corresponding to that of the second set of ears on a rear surface of the pager 9 in the vertical direction against the basic body of the pager 9. The belt clip 1 is fixed to the pager 9 by positionally aligning the second set of ears 4 of the belt clip 1 to the first set of ears of the pager 9 and inserting a pin bar 11 to the pin holes 4a and 10a aligned to each other.

Figure 4:
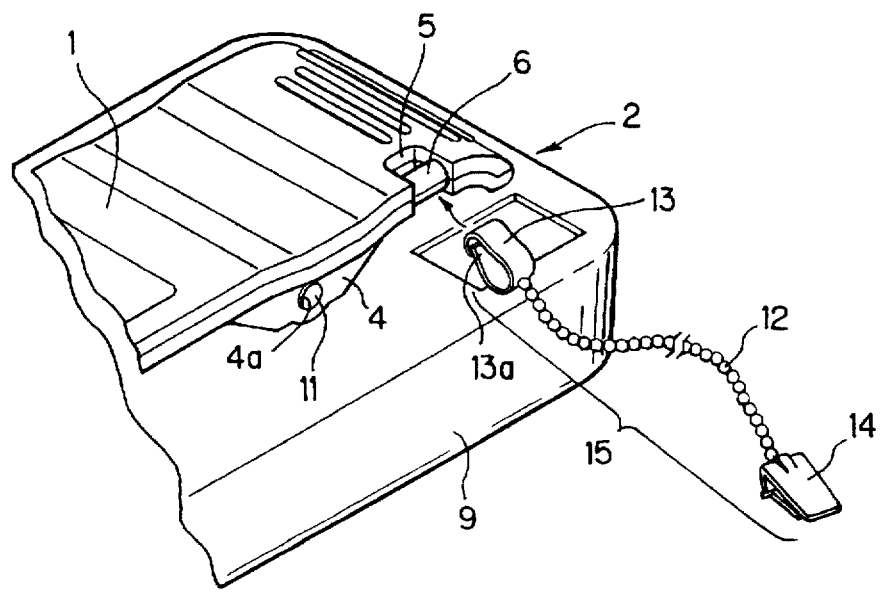
FIG. 4 is an explanatory view showing a method of connecting a chain clip to a belt clip according to the present invention.
Figure 5A:
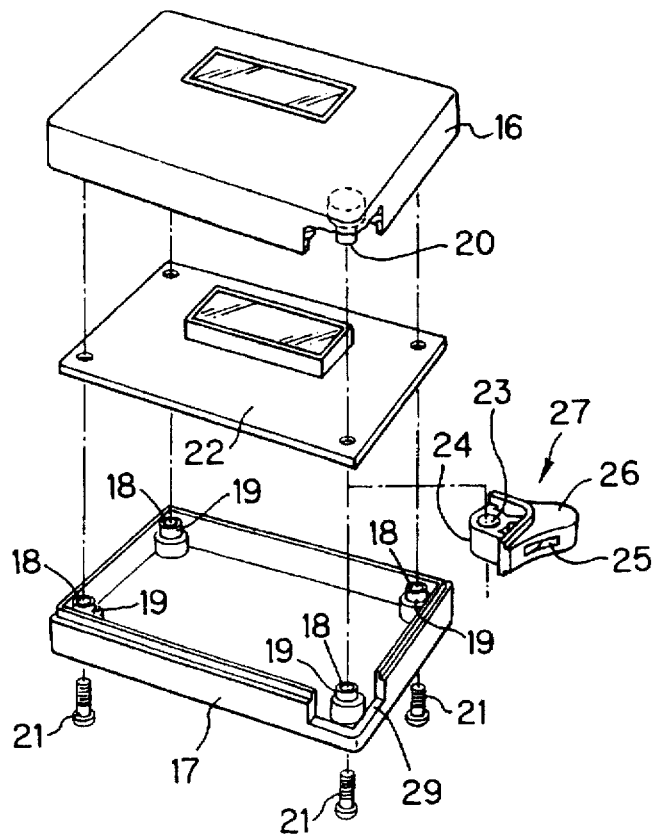
FIGS. 5A and 5B are explanatory views showing a conventional type of structure for fitting a chain clip to a portable terminal unit such as a pager.
Figure 5B:
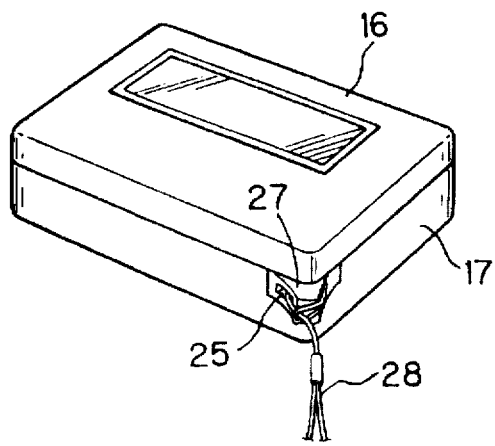
Figure 6A:
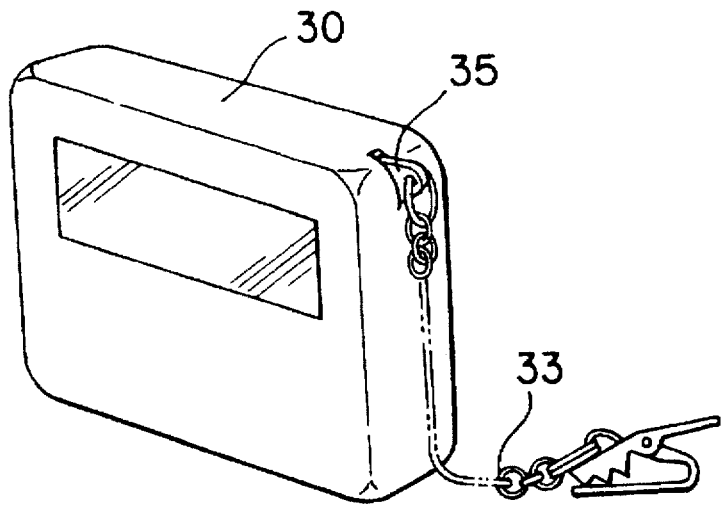
Figure 6B:
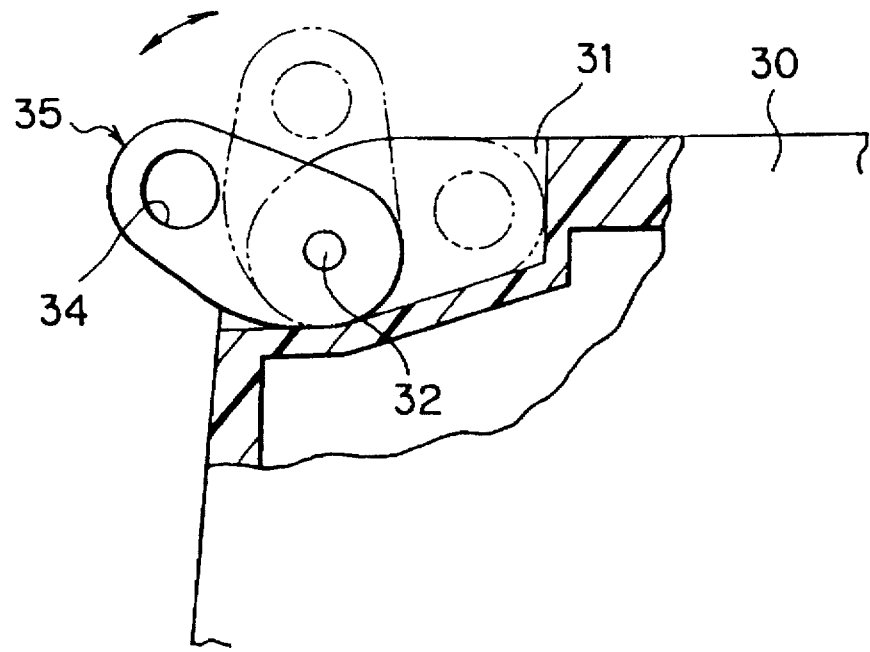

Then description is made for a case where a chain clip is fitted to a receiving section 2 of the belt clip 1 clamped to the pager 9 shown in FIG. 3 above with reference to FIG. 4. A chain clip 15 comprises a chain 12 having a specified length, a ring-shaped clip 13 having a connection port 13a connected to one edge of the chain 12, and an alligator clip 14 connected to another edge of the chain 12.

When fitting the ring-shaped clip 13 to the receiving section 2 of the belt clip 1, the ring-shaped 13 is aligned and contacted to the notched section 5 of the receiving section 2, and the engaging pin 6 is pressed against the connection port 13a. As a result, the connection port 13a opens its mouth to the engaging pin 6, the engaging pin 6 goes into the ring-shaped clip 13, and the ring-shaped clip 13 is engaged with the receiving section 2 of the belt clip 1.

Then a user of the pager clips the belt clip clamped to pager 9 to a belt for the user's trousers (not shown herein), and furthermore the alligator clip 14 of the chain clip 15 is clipped to, for instance, a pocket mouth of the trousers, thus the pager being prevented from dropping to the ground.

It should be noted that a form of the receiving section described above is not limited to that described in relation the above embodiments so long as it is integrated with a belt clip with molded resin and also the position is not limited to any specific position so long as it is formed in a belt clip.

As described above, with the belt clip integrated with a structure for receiving a chain clip according to the present invention, in a belt clip clamped to a portable terminal unit such as a pager for clapping the portable terminal unit to belt, a receiving section for receiving a chain clip is integrated with the belt clip with molded resin, so that a number of required parts can be reduced with the product cost also reduced, and it is possible to prevent the assembly process from becoming complicated.

Also an unnecessary projection from the belt clip can be eliminated with the design simplified, and troubles in actual use can be excluded.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A belt clip integrated with a structure for receiving a chain clip to be clamped to a portable terminal unit for clipping the portable terminal unit to a belt, wherein a notched receiving section for receiving the chain clip integrated with said belt clip with molded resin is formed along only one longitudinal edge of said belt clip.

2. A belt clip integrated with a structure for receiving a chain clip according to claim 1, wherein said notched receiving section is formed in said belt clip along one longitudinal edge thereof.

3. A belt clip integrated with a structure for receiving a chain clip according to claim 1, wherein said notched receiving section has a form of a pin monolithically formed with molded resin for fitting the chain clip.

4. A belt clip integrated with a structure for receiving a chain clip according to claim 3, wherein said receiving section is formed in said belt clip along one longitudinal edge of said belt clip.

5. A belt clip integrated with a structure for receiving a chain clip according to claim 1, wherein said receiving section is monolithically formed with molded resin into a form of a hole for fitting the chain clip thereto.

6. A belt clip integrated with a structure for receiving a chain clip according to claim 5 wherein said receiving section is formed in said belt clip along one longitudinal edge of said belt clip.

7. A belt clip integrated with a structure for receiving a chain clip comprising:

a notched receiving section provided along only one longitudinal edge of said belt clip for an edge of a chain clip to be engaged therewith;

a hook-shaped hooking section provided for clamping said belt clip to a belt for trousers; and a second set of ears provided in a rear surface of said belt clip against a basic body of the belt clip and having a pinhole for clamping said belt clip to a first set of ears of a basic body of a portable terminal unit, said notched receiving section, said hook-shaped hooking section and said second set of ears monolithically formed by molding.

8. A belt clip integrated with a structure for receiving a chain clip according to claim 7, wherein an engaging pin for engaging said chain clip therein is monolithically formed with, and located inside, said notched receiving section.

* * * * *